United States Patent
Stötzner

(10) Patent No.: US 12,122,314 B2
(45) Date of Patent: Oct. 22, 2024

(54) PARTITION FOR VEHICLE

(71) Applicant: Weber Fibertech GmbH, Markdorf (DE)

(72) Inventor: Norbert Stötzner, Markdorf (DE)

(73) Assignee: WEBER FIBERTECH GMBH, Markdorf (DE)

(*) Notice: Subject to any disclaimer, the term of this patent is extended or adjusted under 35 U.S.C. 154(b) by 333 days.

(21) Appl. No.: 17/590,448

(22) Filed: Feb. 1, 2022

(65) Prior Publication Data
US 2022/0258685 A1 Aug. 18, 2022

(30) Foreign Application Priority Data
Feb. 12, 2021 (DE) .................... 20 2021 100 719.2

(51) Int. Cl.
B60R 21/02 (2006.01)
(52) U.S. Cl.
CPC .................. B60R 21/026 (2013.01)
(58) Field of Classification Search
CPC ............. B60R 21/02; B60R 21/026
USPC ..................... 296/24.4, 42, 43; 410/118, 129
See application file for complete search history.

(56) References Cited

U.S. PATENT DOCUMENTS 10,214,245 B2 * 2/2019 Kim .................... B62D 29/043
2017/0253190 A1 9/2017 Hodges

FOREIGN PATENT DOCUMENTS

| CN | 203753049 U | 8/2014 | |
| CN | 108357455 B * | 9/2020 | ........... B60R 21/026 |
| WO | WO 2013/140053 A1 | 9/2013 | |

OTHER PUBLICATIONS

Text CN 108357455 (Year: 2020).*
European Patent Office Search Report for EP 22154922 dated Jun. 2, 2022.

* cited by examiner

Primary Examiner — Dennis H Pedder
(74) Attorney, Agent, or Firm — FRESH IP PLC

(57) ABSTRACT

Partition for a vehicle, including an upper partition half and a lower partition half which are arranged relative to one another in such a way that they overlap in the vertical direction in an overlapping region, so that a channel) is formed in this overlapping region.

9 Claims, 5 Drawing Sheets

PARTITION FOR VEHICLE

FIELD OF THE INVENTION

The invention relates to a partition for a vehicle or motor vehicle, in particular a transport vehicle, and a vehicle having such a partition.

BACKGROUND OF THE INVENTION

Motor vehicles intended for the transport of goods have a cargo area that is separated from the driver's cab by a partition. These partitions are designed to divide the vehicle interior in such a way that a space for people, in particular for the driver, and a space for goods to be transported is provided.

When it comes to partitions, the aim is to enable good spatial division with high variability at the same time. In particular, the partition should provide a safe separation between the cargo area and the driver's cab without being too complex and too heavy.

Conventional partitions for cars and vans are usually made of steel and are therefore heavier and not optimal in terms of acoustics. The partition serves to protect the driver from objects in the cargo area and creates a separation from the cargo area. For improved rearward visibility, the partition optionally comprises a window pane. Such partitions are typically formed in one piece.

DE 83 26 707 U describes a one-piece partition with a seat structure, the lower part being designed as a seat and the upper part as a backrest in the form of a relatively flat wall portion.

There are also plastic partitions with steel struts for reinforcement. These exhibit an improved acoustic performance. However, these partitions are very heavy due to the steel struts used and are also mostly designed without a window pane. If a window pane is to be present, it comprises a grille to protect the window pane due to its elastic material.

EP 1 650 086 A1 describes a motor vehicle with a cargo area and a driver's cab, which are separated from one another by a partition. The partition has two surfaces pivotally connected to one another by a hinge. This partition is thus divided vertically, i.e. the partition comprises two vertically separate portions or surfaces. The two surfaces are thus separated from one another by a vertical line and form a right and left half of the partition.

SUMMARY OF THE INVENTION

Against this background, a partition and a vehicle according with the features as disclosed herein are presented. Embodiments are also disclosed herein from the description.

The presented partition is designed for use in the interior of a vehicle or motor vehicle, in particular a truck or transport vehicle. The partition comprises an upper partition half or an upper partition part and a lower partition half or a lower partition part. The two partition halves are arranged relative to one another or joined or assembled in such a way that they overlap in the vertical direction in an overlapping region, so that a channel is formed in this overlapping region.

The terms above and below refer to the upper partition half when assembled in the vehicle being positioned over the lower partition half, except for the overlapping region. The two partition halves are connected to one another in such a way that they form a stable partition that enables a secure separation of two spaces, typically a passenger compartment and a cargo area or transport space. The partition is thus divided horizontally, i.e. a line which runs along the transition region between the upper partition half and the lower partition half essentially runs in the horizontal direction.

The overlapping region is a region where the two partition halves overlap in the vertical direction. Such an overlap is achieved by special shaping of at least one of the two partition halves and/or by arranging the two partition halves offset relative to one another in the longitudinal direction of the vehicle. This overlapping region is designed in such a way that a channel with, for example, a rectangular cross-section is formed. This channel represents a reinforcement of the partition and makes it possible to provide a sufficiently stable partition without having to use particularly stable and heavy materials, such as metals.

In one embodiment, the two partition wall halves are made from plastics. Fiber-reinforced plastics, for example, can be used for this purpose. Thus, the partition can be made of a light material, which in turn increases the maximum load capacity.

A reinforcement, for example a continuous fiber tape, can be provided in the region of the channel. An LFT material (LFT: long fiber reinforced thermoplastics) can also be used here.

The two partition halves should be securely connected to one another. A screw connection, for example, can be used for this purpose.

A recess can be provided in the partition. This is typically installed in the upper partition half and allows a person in the passenger compartment to look back into the transport space in order to check whether the goods being transported have slipped.

For example, a grille or a window pane made of a transparent material can be inserted into the recess.

Air gaps and/or air ducts can also be provided in order to fulfill a ventilation function.

A vehicle, in particular a motor vehicle, is also presented having a vehicle interior in which a partition of the type described herein is provided in the vehicle interior. This partition is designed to divide or subdivide the vehicle interior into two spaces.

The vehicle described has a partition of the type described herein in its interior. In this way, the interior of the vehicle is divided into two spaces that can be completely separated from one another. The two spaces are typically a driver's cab and a cargo area.

The partition presented makes it lighter on the one hand and exhibits an improved acoustic performance on the other. In addition, manufacturing with plastics is more economical and sustainable in production. The attachment of ribbing can be implemented more easily and there is greater freedom of design.

In contrast to other partitions, this means that there is no need for a steel strut for support. In this case, the partition is divided horizontally, i.e. the separation between the two parts or halves runs essentially horizontally, which facilitates installation in the vehicle. There is therefore a lower and an upper part. The upper and lower parts overlap to form a channel. This creates a larger moment of inertia and ensures less deformation and greater rigidity of the partition.

A continuous fiber tape can be inserted to further strengthen this channel.

Both parts can be joined together by means of a screw connection suitable for plastics. A direct screw connection or plastic inserts for metal screws can be used here.

If a window pane is provided in the partition, it can be designed without a grille. This can be achieved by using a long fiber or LFT material that exhibits greater rigidity. In this way, the window pane cannot deform to such a great extent.

In order to equalize the pressure in the vehicle, the partition can also fulfill a ventilation function, which is provided by air gaps or air ducts.

Further advantages and embodiments of the invention emerge from the description and the accompanying drawings.

It goes without saying that the features mentioned above and those yet to be explained below can be used not only in the respectively specified combination, but also in other combinations or on their own, without departing from the scope of the present invention.

DETAILED DESCRIPTION OF THE INVENTION

Figure 1:
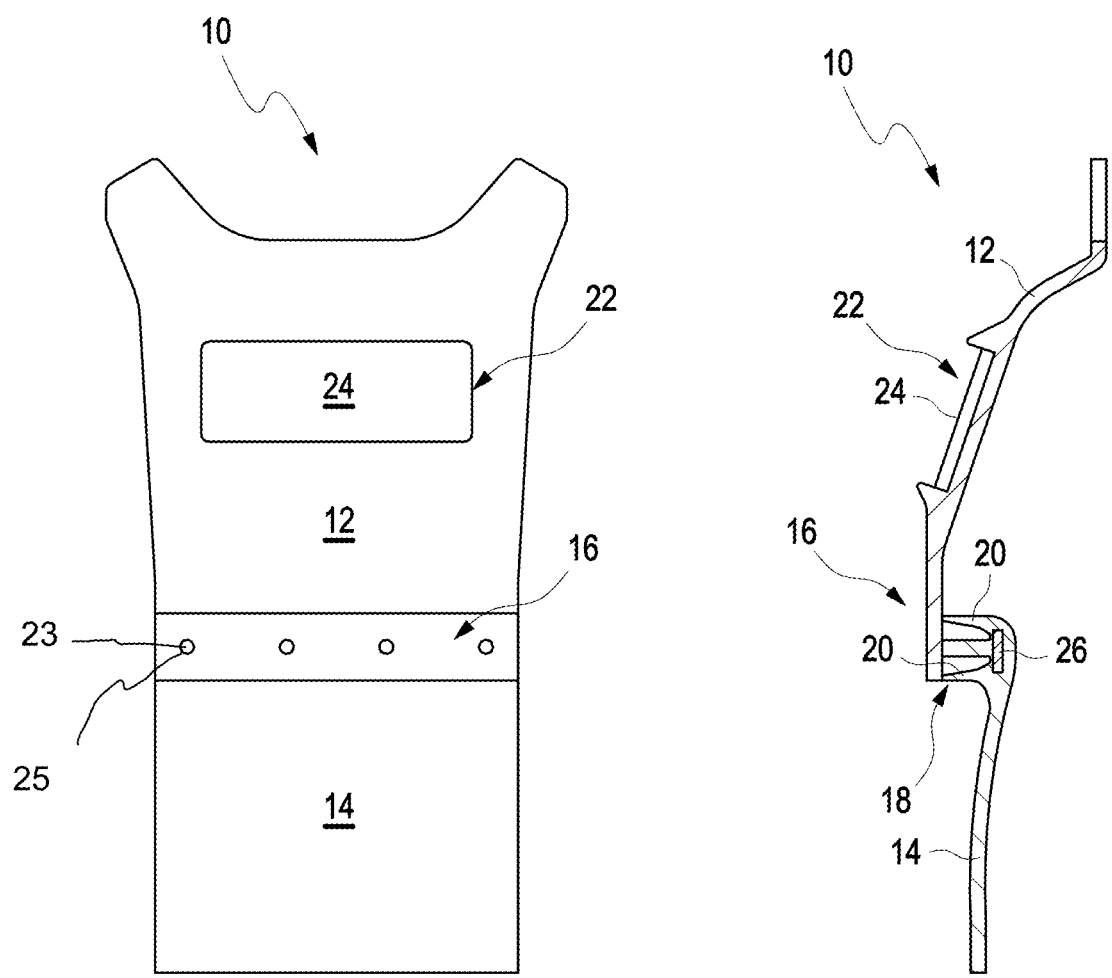
FIG. 1 shows one embodiment of a partition in plan view and side view.

The invention is shown schematically in the drawings by means of embodiments and is described in detail below with reference to the drawings.

FIG. 1 shows one embodiment of a partition which is denoted as a whole by reference numeral 10. This partition 10 is shown in plan view on the left and in side view on the right.

The partition 10 comprises an upper partition half 12 and a lower partition half 14 which are arranged relative to one another in such a way that an overlapping region 16 is formed. As can be seen on the right, this overlapping region 16 is in the form of a channel 18. The side view also makes it clear that the two partition halves 12 and 14 are arranged slightly offset from one another. Furthermore, the lower partition half 14 has a special shape in its upper region with two continuous webs 20 in the horizontal direction, which together with the lower region of the upper partition half 12 form or define the channel 18.

The upper partition half 12 also has a recess 22 into which a window pane 24 made of a transparent material is inserted. Glass or plastics, for example, can be used for this purpose.

Furthermore, a continuous fiber tape 26 is attached to the lower partition half 14 between the two webs 20 in the channel 18 and provides additional reinforcement of the channel 18 and thus of the entire partition wall 10.

Figure 2:
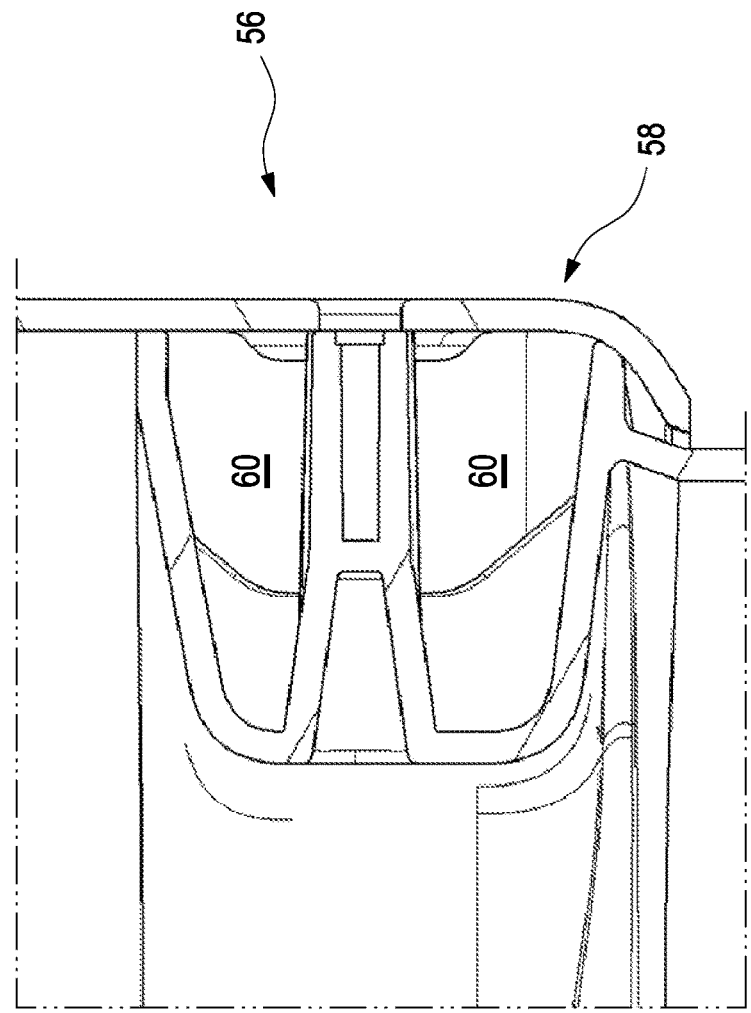
FIG. 2 shows one embodiment of a partition in side view as well as a section from this illustration.
Figure 2:
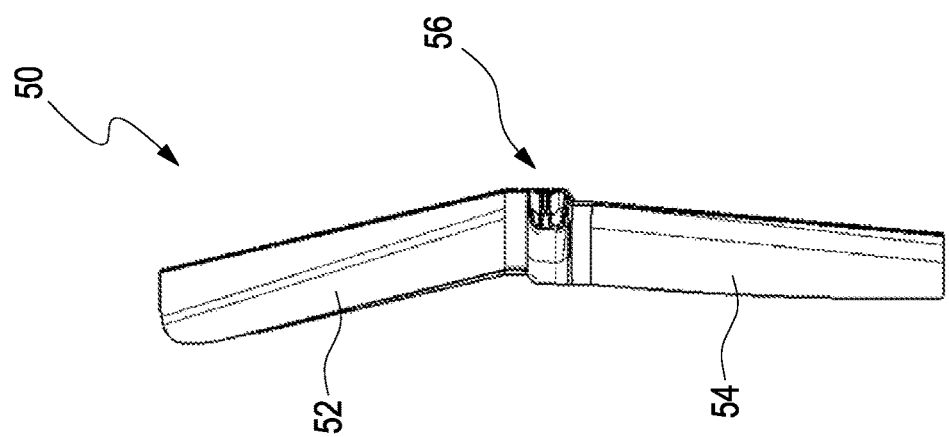

FIG. 2 shows an embodiment of a partition in side view on the left, which partition is denoted as a whole by reference numeral 50. This partition 50 comprises an upper partition half 52 and a lower partition half 54. In the transition region between the two partition halves 52, 54, an overlapping region 56 is formed, which is shown enlarged on the right in FIG. 2.

The overlapping region 56 is formed as a channel 58, which in this case has two chambers 60 running in the horizontal direction. The special shape of the overlapping region 56 offers reinforcement of the partition 50 and ensures high stability.

Both parts can be joined together by means of a screw connection suitable for plastics. A direct screw connection or plastic inserts 25 for metal screws 23 can be used here.

Figure 3:
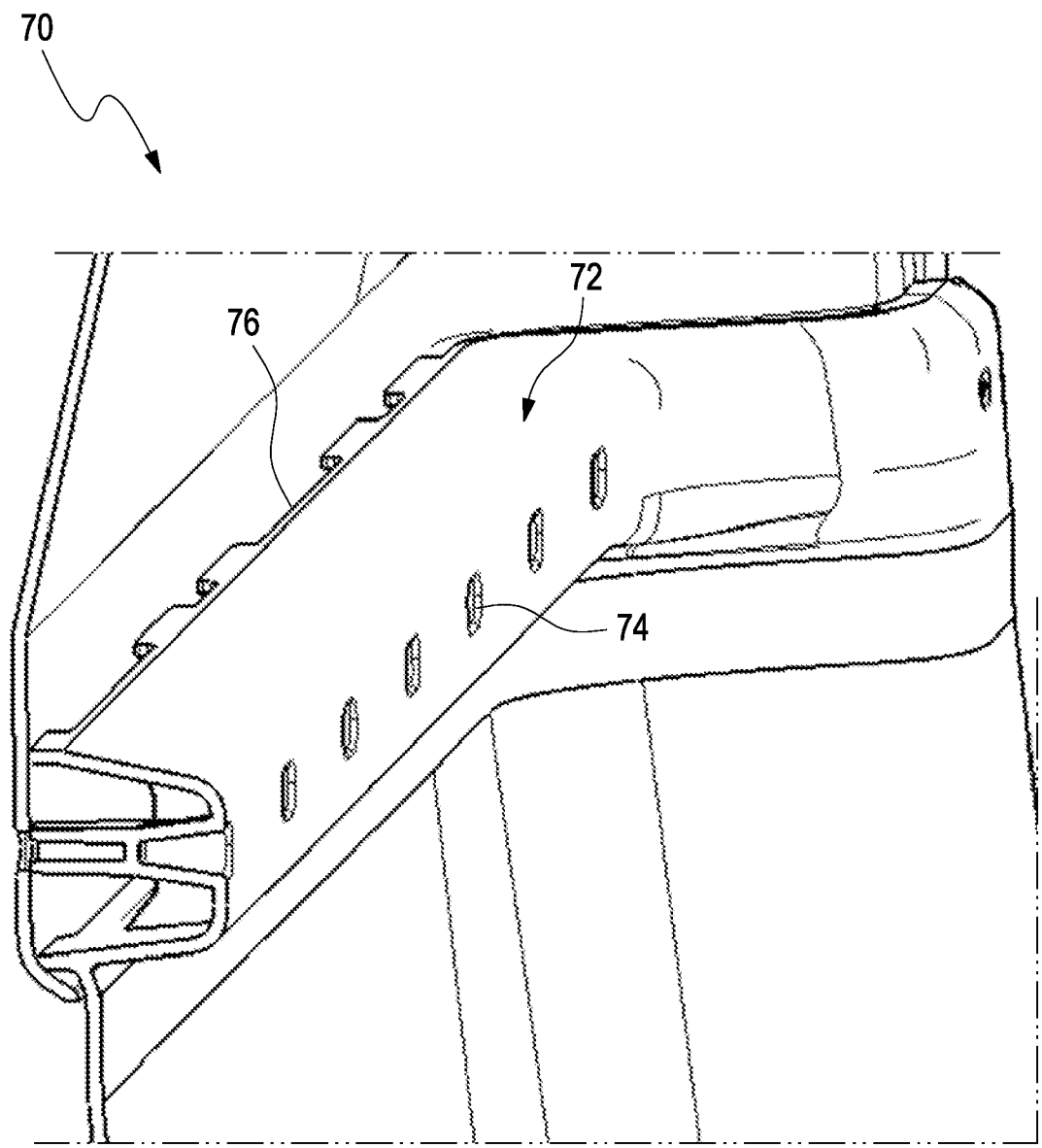
FIG. 3 shows a detail of one embodiment of the partition.

FIG. 3 shows an overlapping region of a partition which is denoted by reference numeral 70. This is designed as a channel 72. It can be seen that the channel 72 is not completely closed, but that it is designed in such a way that air gaps 74 and air ducts 76 are provided. The stability of the channel 72 is not impaired by these air gaps 74 and air ducts 76. They can, however, fulfill a ventilation function.

Figure 4:
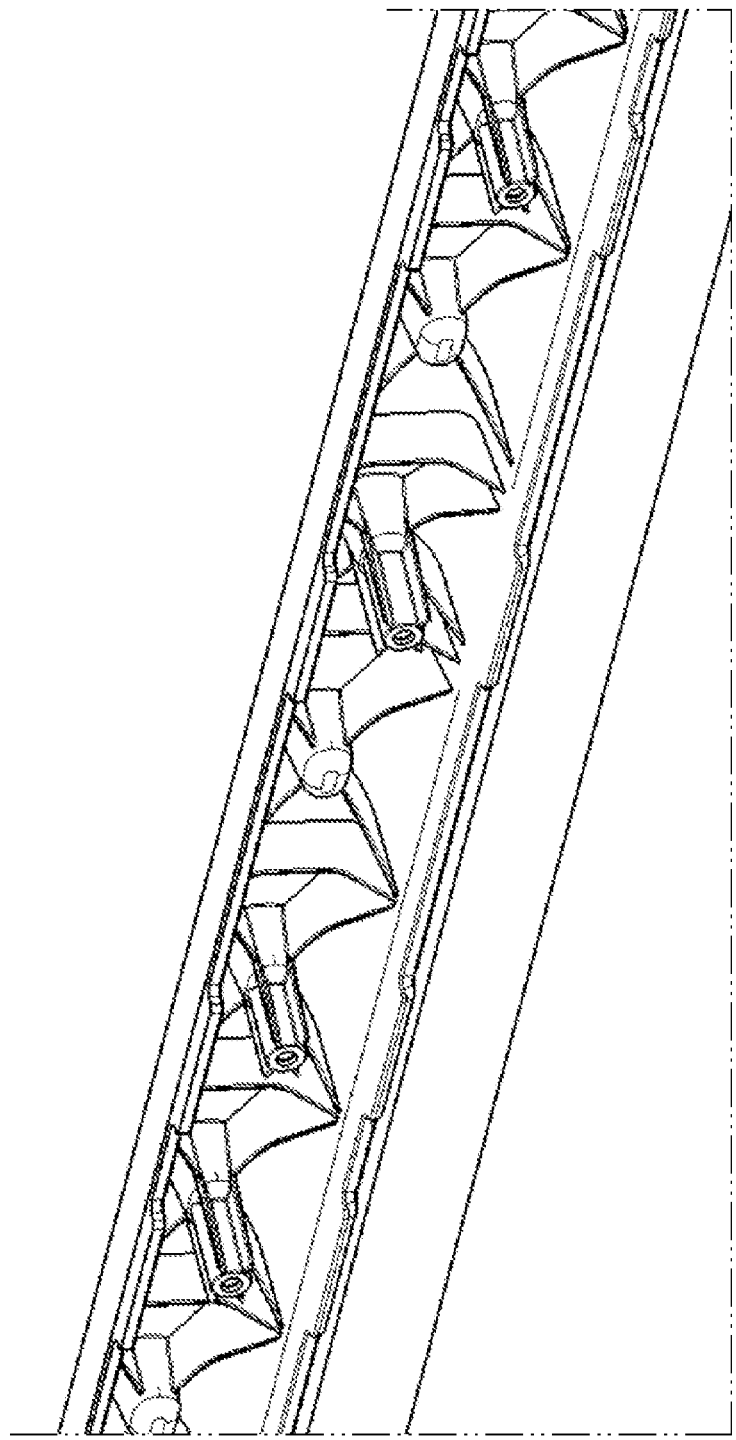
FIG. 4 shows a further detail of one embodiment of the partition.

FIG. 4 shows a view similar to that of FIG. 3, viewed only from the side and without the upper portion.

Figure 5:
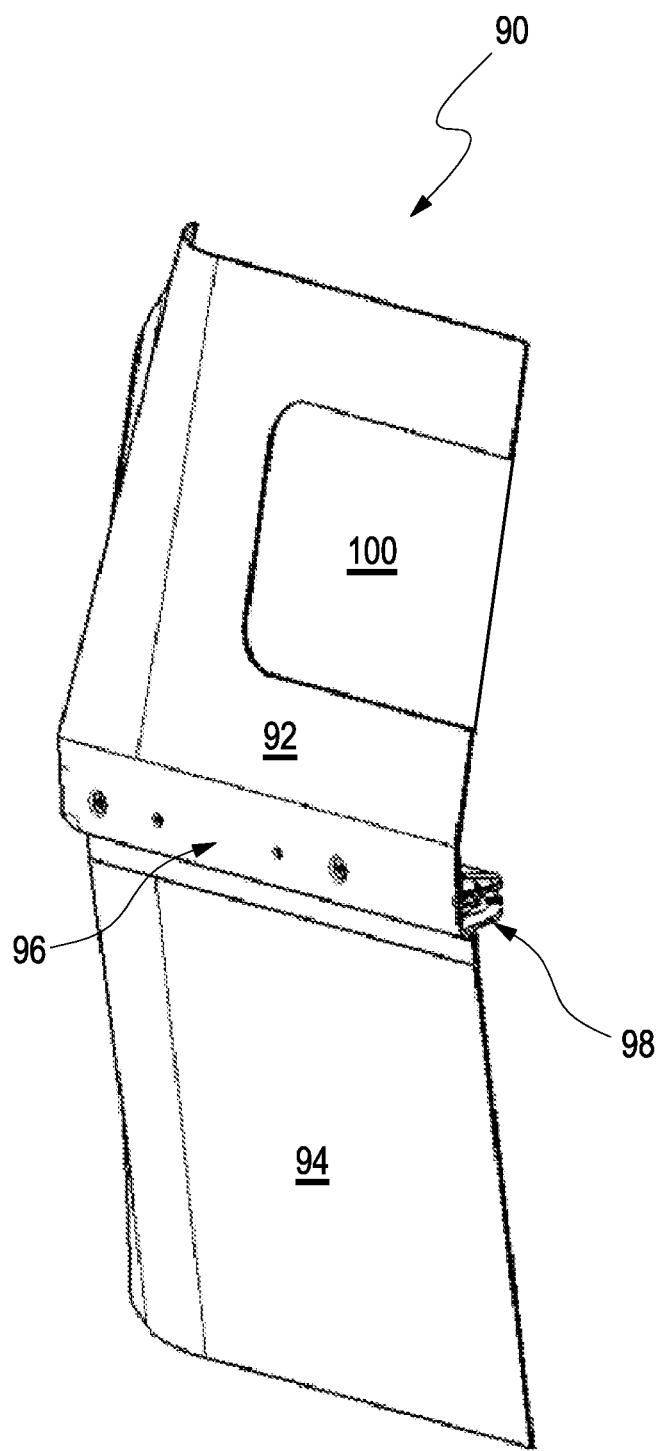
FIG. 5 shows a section of one embodiment of the partition.

FIG. 5 shows the left portion of a partition, denoted as a whole by reference numeral 90. This partition 90 comprises an upper partition half 92 and a lower partition half 94 which are arranged relative to one another and connected to one another in such a way that an overlapping region 96 which is shaped as a channel 98 is formed. This channel 98 is for reinforcement. Provision can also be made for electrical lines, for example signal lines, to be routed through this channel 98.

The illustration also shows a window pane 100, which is provided in the upper partition half 92.

I claim:

1. Partition for a vehicle, comprising:
an upper partition half and a lower partition half which are arranged relative to one another in such a way that they overlap in the vertical direction in an overlapping region, so that a channel is formed in the overlapping region; and
wherein the channel is designed in such a way that air gaps and/or air ducts are provided in order to fulfill a ventilation function.

2. Partition according to claim 1, wherein the two partition halves are made of plastics.

3. Partition according to claim 1, wherein reinforcement is provided in the overlapping region.

4. Partition according to claim 3, wherein the reinforcement is realized by a continuous fiber tape.

5. Partition wall according to claim 1, wherein the upper partition half and the lower partition half are joined together by a screw connection.

6. Partition according to claim 5, wherein plastic inserts for metal screws are used for the screw connection.

7. Partition according to claim 1, wherein a recess is provided in the partition.

8. Partition according to claim 7, wherein a window pane made of a transparent material is inserted into the recess.

9. Vehicle, comprising:
an interior space in the vehicle;
a partition inside the interior of the vehicle configured to divide the interior space into two spaces;
the partition including an upper partition half and a lower partition half which are arranged relative to one another in such a way that they overlap in the vertical direction in an overlapping region, so that a channel is formed in the overlapping region; and
the channel is designed in such a way that air gaps and/or air ducts are provided in order to fulfill a ventilation function.

* * * * *